(12) United States Patent
Brunner et al.

(10) Patent No.: US 11,165,289 B2
(45) Date of Patent: Nov. 2, 2021

(54) ELECTRONICALLY COMMUTATED DC MOTOR

(71) Applicant: Bühler Motor GmbH, Nuremberg (DE)

(72) Inventors: Achim Brunner, Bubenreuth (DE); Armin Suttner-Reimann, Schwabach (DE); Mladen Zec, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 72 days.

(21) Appl. No.: 16/135,411

(22) Filed: Sep. 19, 2018

(65) Prior Publication Data

US 2019/0103773 A1 Apr. 4, 2019

(30) Foreign Application Priority Data

Oct. 4, 2017 (DE) ...................... 10 2017 217 619.9

(51) Int. Cl.
| | |
|---|---|
| *H02K 1/17* | (2006.01) |
| *H02K 5/06* | (2006.01) |
| *H02K 3/04* | (2006.01) |
| *H02K 21/14* | (2006.01) |
| *H02K 7/106* | (2006.01) |
| *H02K 3/47* | (2006.01) |
| *H02K 1/22* | (2006.01) |
| *H02K 3/28* | (2006.01) |

(52) U.S. Cl.
CPC ................. *H02K 1/17* (2013.01); *H02K 3/04* (2013.01); *H02K 3/47* (2013.01); *H02K 5/06* (2013.01); *H02K 7/106* (2013.01); *H02K 21/14* (2013.01); *H02K 1/223* (2013.01); *H02K 3/28* (2013.01); *H02K 2213/03* (2013.01)

(58) Field of Classification Search
CPC ........ H02K 1/27; H02K 1/2706; H02K 1/274; H02K 1/276; H02K 21/14; H02K 21/145
USPC .............. 310/156.08–156.14, 156.38–156.46
See application file for complete search history.

(56) References Cited

U.S. PATENT DOCUMENTS

| | | | |
|---|---|---|---|
| 3,375,423 A * | 3/1968 | Mayer ...................... | G04C 3/14 318/400.05 |
| 4,973,871 A | 11/1990 | Bisantz | |

(Continued)

FOREIGN PATENT DOCUMENTS

| | | |
|---|---|---|
| CH | 400326 A | 10/1965 |
| DE | 203 02 171 U1 | 5/2003 |

(Continued)

OTHER PUBLICATIONS

Search Report dated Aug. 7, 2018, issued in counterpart German Patent Application No. 10 2017 217 619.9 (5 pages).

*Primary Examiner* — Bernard Rojas
(74) *Attorney, Agent, or Firm* — Westerman, Hattori, Daniels & Adrian, LLP

(57) ABSTRACT

An electronically commutated direct current motor made up of a cylindrically shaped non-ferrous stator winding; a cylindrically shaped, magnetically conductive back iron arranged radially outside of the stator winding; and a cylindrically shaped permanent magnet rotor arranged concentrically within the stator winding, wherein the magnetically conductive back iron has different magnetic conductivities over its circumference.

7 Claims, 3 Drawing Sheets

(56) References Cited

U.S. PATENT DOCUMENTS

| | | | |
|---|---|---|---|
| 5,692,882 A * | 12/1997 | Bozeman, Jr. | A61M 1/10 |
| | | | 417/45 |
| 6,643,911 B2 | 11/2003 | Nakamura et al. | |
| 6,794,789 B2 | 9/2004 | Siess et al. | |
| 2004/0169428 A1 | 9/2004 | Sano et al. | |
| 2010/0084938 A1* | 4/2010 | Palmer | H02K 3/04 |
| | | | 310/156.36 |
| 2014/0339929 A1* | 11/2014 | Himmel | H02K 15/12 |
| | | | 310/43 |
| 2016/0056687 A1 | 2/2016 | Kawashima et al. | |

FOREIGN PATENT DOCUMENTS

| | | |
|---|---|---|
| DE | 203 13 943 U1 | 12/2003 |
| DE | 10 2008 039 194 A1 | 2/2010 |
| DE | 10 2009 046 902 A1 | 5/2011 |
| JP | 2002-136034 A | 5/2002 |

* cited by examiner

ELECTRONICALLY COMMUTATED DC MOTOR

CROSS-REFERENCE TO RELATED APPLICATIONS

The present patent application is based on, and claims priority from, German Application No. DE 10 2017 217 619.9, filed Oct. 4, 2017 which is incorporated herein by reference in its entirety.

BACKGROUND OF THE INVENTION

(1) Field of the Invention

The invention relates to an electronically commutated direct current motor with a non-ferrous stator winding, a back iron arranged radially outside the stator winding, and a permanent magnet rotor.

(2) Description of the Related Art Including Information Disclosed Under 37 CFR 1.97 and 1.98

Non-ferrous windings are used in motors that are to have a small size and/or a low weight and/or a low cogging torque. A considerable cogging torque develops in core-slotted direct current motors, in particular as a result of pronounced stator poles and/or a low number of pole pairs both on the stator and on the rotor. Using slotted motors, higher torques can naturally be produced. The cogging torque developing in the process is often affected by a change of the pole geometry in such a way that noises and vibrations are reduced to a degree that is tolerable in the individual case or at least modified. These measures result in a reduction of the degree of efficiency. The same applies to non-ferrous stator windings, which are generally wound continuously or consist of a circuit board layout with correspondingly continuously arranged conductor loops. A low cogging torque cannot be completely avoided, even in non-ferrous motors.

In commutator motors, it is known (U.S. Pat. No. 6,643,911 B2, US 2016/056687 A1, DE 10 2008 039 194 A1, DE 203 13 943 U1, and U.S. Pat. No. 4,973,871 B1) to give the thickness of the stator back iron an alternating design in order to save weight since the concentration of the magnetic field lines is not constant over the circumference. It is known from DE 10 2009 046 902 A1 to vary the thickness of the stator back iron over the circumference but to design the total thickness of the pole housing so as to be constant.

US 2004/169428 A1 describes a commutator motor with an additional sleeve for reinforcing the back iron ring. From DE 203 02 171 U1 is known a motor with a non-ferrous winding, in which the stator back iron consists of a tube manufactured by powder metallurgy and a stabilizing sleeve of magnetically conductive material mounted thereon. JP 2002-136034 A shows a non-constant stator back iron in a non-ferrous motor. U.S. Pat. No. 6,794,789 B2 shows recesses in the back iron shell, wherein these recesses extend spirally around the circumference of the stator.

One field of application for electronically commutated direct current motors is drives for roller blinds, venetian blinds, rolling gates, etc. Generally, the direct current motors in this case are installed in narrow tubes, which at the same time serve as a reel for receiving the roller blind segments, etc. As a result of the tight spatial conditions, it is expedient to use electronically commutated direct current motors with a non-ferrous stator winding for this purpose. The holding torque in these direct current motors is however limited which means that complex braking devices must be used to be able to provide the required holding and braking forces.

Another application example is medication dispensing units, in particular insulin pumps. In this case, no uncontrolled rotor rotations as a result of vibrations, outside magnetic fields or similar can be permitted since this could result in incorrect dosing.

BRIEF SUMMARY OF THE INVENTION

The task of the invention is to ensure a sufficient braking torque in an electronically commutated direct current motor with non-ferrous stator winding in order to avoid an automatic adjustment of an attachment unit, wherein the direct current motor has as small a size as possible, in particular in the radial direction, and a low weight and the amplitude, form, and frequency of the braking torque is to be freely optimizable independently of the winding design.

Because the magnetically conductive back iron has different magnetic conductivities over its circumference, a cogging torque develops, and thus a braking or holding torque during standstill of the rotor. As a result of the different magnetic conductivities, the magnetic field lines of the rotor magnetic field are conducted differently within different angular ranges so that preferred ranges result, which are separated by angular ranges with higher magnetic reluctance. Several such ranges distributed over the circumference intensify this effect if the number of rotor poles and the number of stator poles are the same or are a whole-number multiple.

One possibility of affecting the magnetic resistance consists of the magnetically conductive back iron having different material thicknesses over its circumference. This can be provided by the back iron being appropriately reshaped or primarily shaped or by the back iron consisting of several assembled parts.

The material thickness can be designed to be alternating in different ways, e.g., by the magnetically conductive back iron having a cylindrical shell surface on its inner circumference but not on its outer circumference. The effect is in this case perceptible but not sufficient for each case of application.

Conversely, the magnetically conductive back iron has a cylindrical shell surface on its outer circumference and an alternating tooth-like geometry on its inner circumference. In this case, the torque jumps are considerably stronger than in the previously described embodiment because the air gap width alternates.

The most marked effect is achieved by a combination of the two variants, in which none of the shell surfaces, neither the inner nor the outer shell surface, is cylindrical but each surface has an alternating tooth-like geometry on its inner and outer surfaces. Expediently, the magnetically conductive back iron fulfills a housing function at least in the cylinder shell region and renders additional housings obsolete.

It is also the aim of the invention to provide a series of direct current motors, in which as wide a variety as possible of different braking torques is produced by a combination of as small a number of different parts as possible or even a normal air gap motor that does not have any increased requirements for a holding or braking torque is generated by omitting a component.

The magnetically conductive back iron may consist of a laminated core assembly, which is produced by die cutting (shearing), laser cutting, or water jet cutting.

BRIEF DESCRIPTION OF THE SEVERAL VIEWS OF THE DRAWINGS

The exemplary embodiments of the invention are subsequently explained in more detail based on the drawings. The following is shown.

Note: The reference numbers with a subscript and the corresponding reference numbers without a subscript refer to details with the same name in the drawings and the drawing description. This reflects use in another embodiment or the prior art, and/or where the detail is a variant.

DETAILED DESCRIPTION OF THE INVENTION

Figure 1:
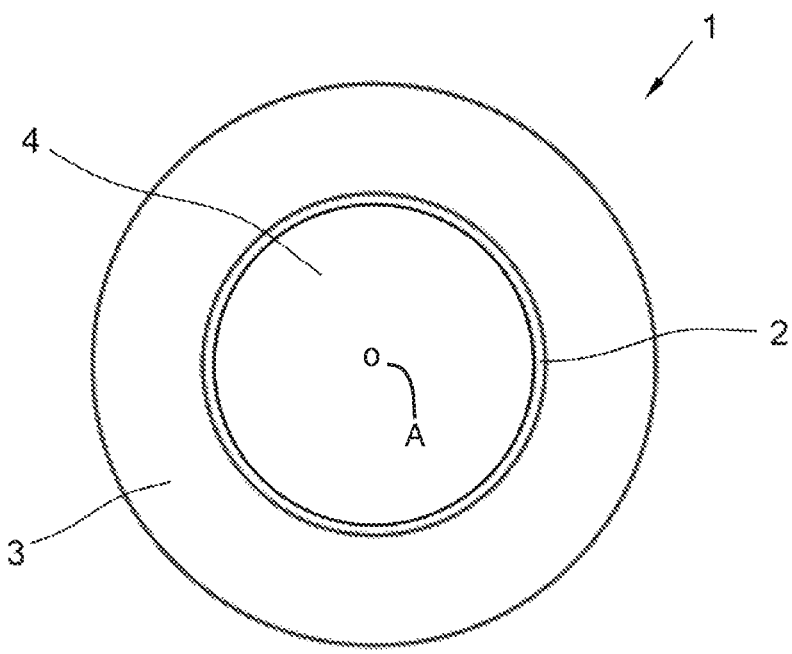
FIG. 1 a conventional electronically commutated direct current motor according to the prior art, FIG. 2 a first embodiment of the invention, and FIG. 3 a second embodiment of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a conventional electronically commutated direct current motor 1 according to the prior art with a hollow-cylindrical magnetically conductive back iron 3, a hollow-cylindrical non-ferrous stator winding 2 abutting against the inner circumference of the back iron 3, and a permanent magnet rotor 4 inside of the stator winding. The rotor defines a motor axis A.

Figure 2:
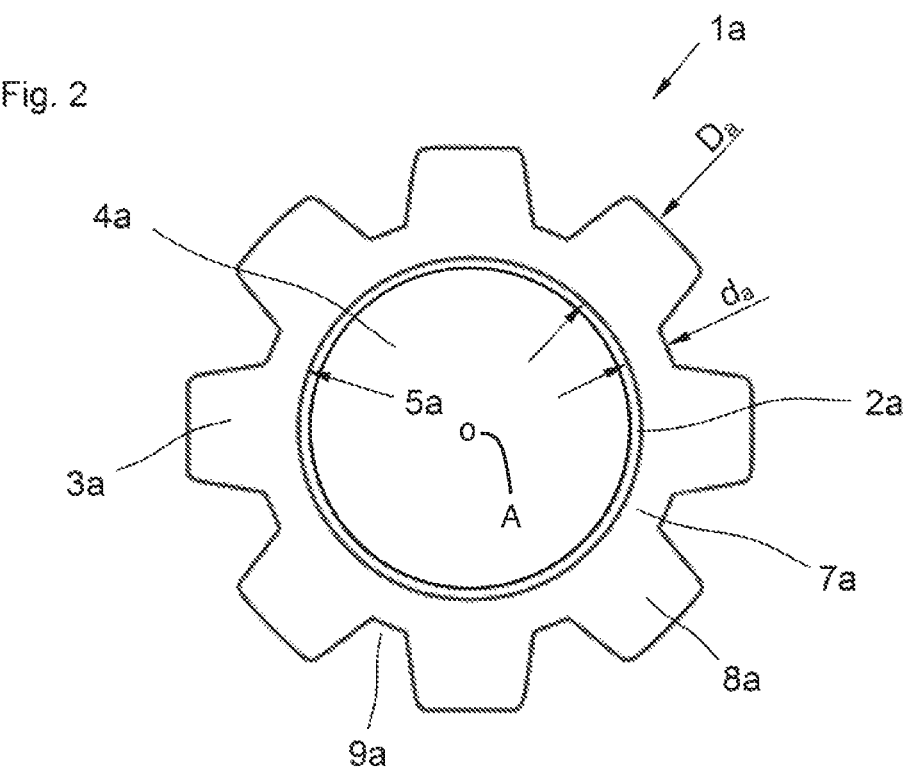

FIG. 2 shows a first embodiment of a direct current motor 1a with a hollow-cylindrical non-ferrous stator winding 2a and a magnetically conductive back iron 3a, which has a cylindrical shell surface 5a on its inner circumference. A closed inner ring 7a has a thickness $d_a$. Reinforcing regions 8a separated by constrictions 9a abut radially outside of the inner ring. The back iron 3a has a greater thickness $D_a$ in the region of the reinforcements. Since the air gap width remains constant, the achievable holding or braking force is less than in a second embodiment. A permanent magnet rotor 4a is inside of the stator winding 2a. The rotor 4a also defines a motor axis A. A motor axis A is also defines by the rotor 4b.

Figure 3:
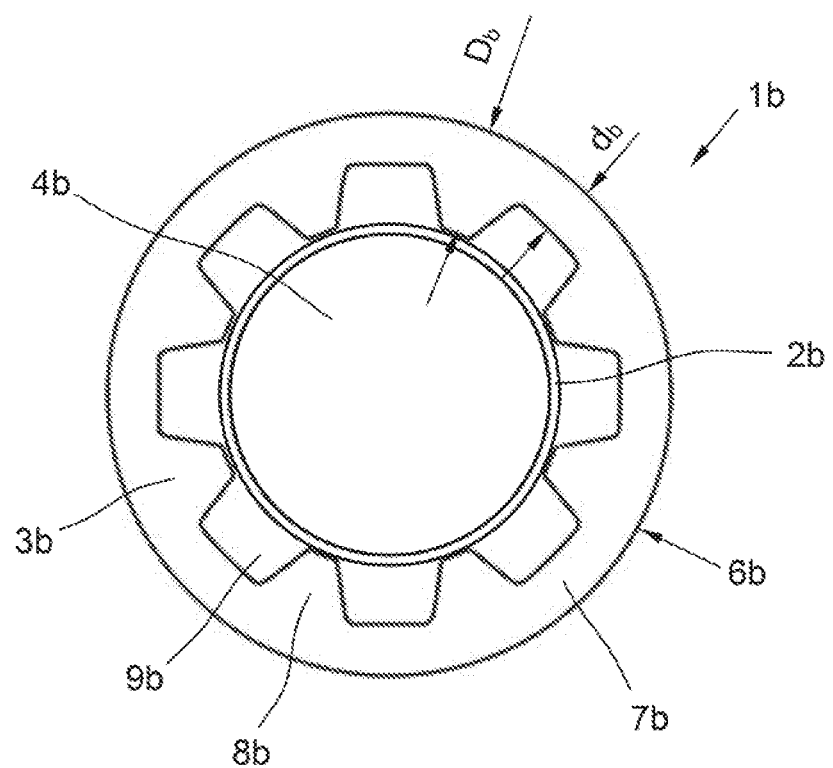

FIG. 3 shows the second embodiment of a direct current motor 1b, which has a magnetically conductive back iron 3b, a hollow-cylindrical non-ferrous stator winding 2b, and a permanent magnet rotor 4b. The back iron 3b has a closed outer cylindrical shell surface 6b. A closed ring 7b has a thickness $d_b$. Reinforcing regions 8b separated by constrictions 9b abut radially inside of the closed ring. The back iron 3b has a greater thickness $D_b$ in the region of the reinforcing regions 8b than the closed ring thickness $d_b$. The air gap width varies in this case between the distance between the permanent magnet rotor 4b and the reinforcing region 8b and the distance between the permanent magnet rotor 4b and the closed ring 7b. As a result, the achievable holding or braking force is considerably greater than in the first embodiment. The closed shell surface 6b can also provide the outer surface for the back iron 3b to act as a housing for the motor.

Figure 4:
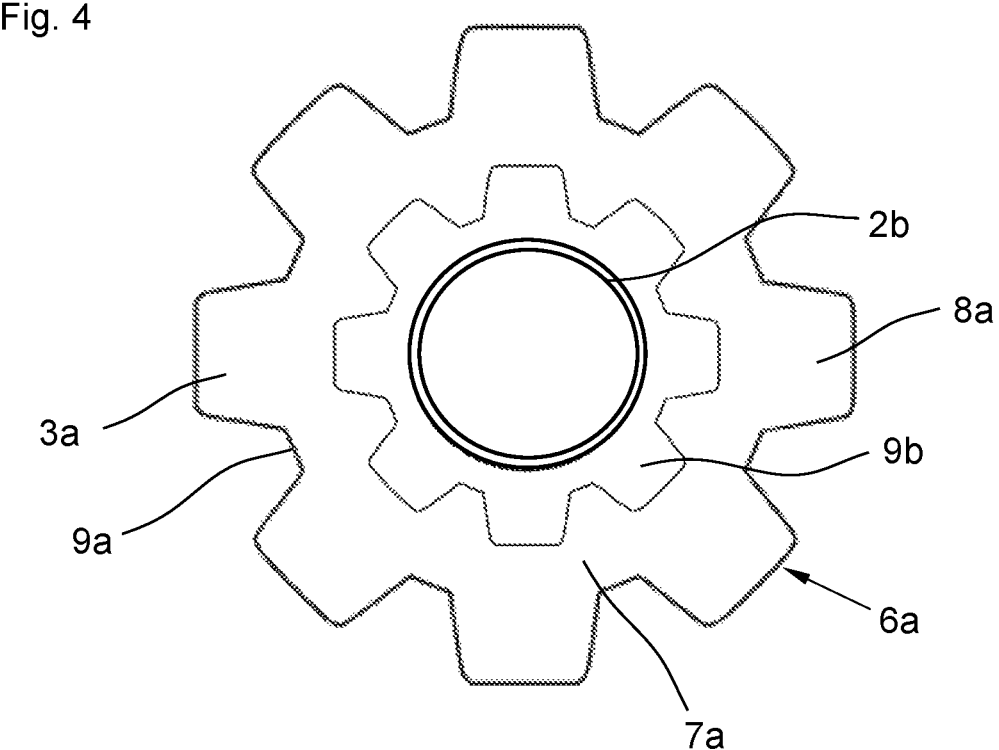
FIG. 4 shows a third embodiment of the invention.

The most marked effect is achieved by a combination of the two variants of FIGS. 2 and 3 as shown in FIG. 4, in which none of the shell surfaces of the back iron 3a, neither the inner shell surface 5a nor the outer shell surface 6a, is cylindrical but each surface has an alternating tooth-like geometry 8a, 8b on its outer and inner surfaces, respectively. The embodiment of FIG. 4 is derived from combining the magnetively conductive back irons 3a and 3b of FIGS. 2 and 3 to become a magnetively conductive back iron that has a tooth-like geometry on both its inner and outer circumferences along the lines shown in FIGS. 2 and 3 with a shared closed inner ring 7a or 7b.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Direct current motor
2 Stator winding
3 Back iron
4 Permanent magnet rotor
5 Inner cylindrical shell surface
6 Outer cylindrical shell surface
7 Inner ring
8 Reinforcing region
9 Constriction

What is claimed is:

1. An electronically commutated direct current motor having a longitudinal motor axis, the motor comprising:
   a cylindrically shaped non-ferrous stator winding surrounding the motor axis;
   a cylindrically shaped, magnetically conductive back iron arranged radially outside of the stator winding, the back iron consisting of a laminated core assembly; and
   a cylindrically shaped permanent magnet rotor arranged concentrically within the stator winding, the rotor defining the motor axis,
   wherein the magnetically conductive back iron has different magnetic conductivities over its circumference defined by
   a closed inner ring surrounding the stator winding,
   a plurality of first reinforcing regions extending radially inward from the inner ring, the first reinforcing regions defining alternating first air gaps,
   the first reinforcing regions and first air gaps defining a plurality of alternating tooth-like geometries, the first reinforcing regions and first air gaps continuously extending generally parallel to the motor axis, wherein the radial thickness of a first reinforcing region is greater that the radial thickness of the inner ring, and
   a plurality of second reinforcing regions radially extending outside of the inner ring, the second reinforcing regions defining alternating second air gaps,
   the second reinforcing regions and second air gaps defining a plurality of second alternating tooth-like geometries, the second regions and second air gaps continuously extending generally parallel to the motor axis, wherein the radial thickness of a second reinforcing region is greater that the radial thickness of the inner ring.

2. The direct current motor according to claim 1, wherein the magnetically conductive back iron has a cylindrical shell surface on its inner circumference.

3. The direct current motor according to claim 1, wherein the magnetically conductive back iron has a cylindrical shell surface on its outer circumference.

4. The direct current motor according to claim 1, wherein the magnetically conductive back iron does not have a cylindrical shell surface on its inner circumference or on its outer circumference.

5. The direct current motor according to claim 1, wherein the magnetically conductive back iron serves as a housing.

6. The direct current motor according to claim 1, wherein the direct current motor is one of a series of motors.

7. An electronically commutated direct current motor having a longitudinal motor axis, the motor comprising:
- a cylindrically shaped non-ferrous stator winding surrounding the motor axis;
- a cylindrically shaped, magnetically conductive back iron arranged radially outside of the stator winding, the back iron consisting of a laminated core assembly; and
- a cylindrically shaped permanent magnet rotor arranged concentrically within the stator winding, the rotor defining the motor axis, wherein the magnetically conductive back iron has different magnetic conductivities over its circumference defined by
- a closed inner ring surrounding the stator winding,
- a plurality of first reinforcing regions radially extending inside of the inner ring, the first reinforcing regions defining alternating first air gaps,
- the first reinforcing regions and first air gaps defining a plurality of first alternating tooth-like geometries, the first regions and first air gaps continuously extending generally parallel to the motor axis, wherein the radial thickness of a first reinforcing region is greater that the radial thickness of the inner ring for developing a braking torque.

* * * * *